(12) United States Patent
Spinelli et al.

(10) Patent No.: US 11,694,479 B1
(45) Date of Patent: Jul. 4, 2023

(54) COMPUTERIZED SYSTEMS AND METHODS FOR CONTINUOUS AND REAL-TIME FATIGUE DETECTION BASED ON COMPUTER VISION ANALYSIS

(71) Applicant: RS1Worklete, LLC, Denver, CO (US)

(72) Inventors: Michael Patrick Spinelli, Croton, NY (US); SivaSankara Reddy Bommireddy, Secaucus, NJ (US)

(73) Assignee: RS1Worklete LLC, Denver, CO (US)

( * ) Notice: Subject to any disclaimer, the term of this patent is extended or adjusted under 35 U.S.C. 154(b) by 0 days.

(21) Appl. No.: 18/046,745

(22) Filed: Oct. 14, 2022

(51) Int. Cl.
G06V 40/20 (2022.01)
G06V 10/776 (2022.01)
G06T 7/00 (2017.01)
G06T 7/246 (2017.01)
G06Q 10/0635 (2023.01)
G08B 21/02 (2006.01)

(52) U.S. Cl.
CPC ......... *G06V 40/20* (2022.01); *G06Q 10/0635* (2013.01); *G06T 7/0012* (2013.01); *G06T 7/246* (2017.01); *G06V 10/776* (2022.01); *G08B 21/02* (2013.01); *G06T 2207/10016* (2013.01); *G06T 2207/20081* (2013.01); *G06T 2207/30196* (2013.01); *G06T 2207/30232* (2013.01)

(58) Field of Classification Search
CPC .. G06V 10/776; G06V 40/20; G06Q 10/0635; G06T 7/0012; G06T 7/246; G06T 2207/10016; G06T 2207/20081; G06T 2207/30196; G06T 2207/30232; G08B 21/02

See application file for complete search history.

(56) References Cited

U.S. PATENT DOCUMENTS

| | | | |
|---|---|---|---|
| 2017/0188894 A1* | 7/2017 | Chang | A61B 5/1121 |
| 2017/0245806 A1* | 8/2017 | Elhawary | A61B 5/1122 |
| 2019/0258851 A1* | 8/2019 | Rajan | G06T 7/20 |
| 2021/0008413 A1* | 1/2021 | Asikainen | A63B 24/0087 |
| 2021/0346761 A1* | 11/2021 | Sterling | A63B 24/0006 |

* cited by examiner

*Primary Examiner* — Nay A Maung
*Assistant Examiner* — Jose M Torres
(74) *Attorney, Agent, or Firm* — Neugeboren O'Dowd PC

(57) ABSTRACT

According to some embodiments, disclosed are systems and methods for a novel framework that performs management of a location and the individuals operating therein based on determined fatigue data of such individuals. The framework may track a person (e.g., a user) at or around a location. Such tracking may be performed based on captured digital imagery of the user via a set of strategically positioned cameras at the location. In some embodiments, as soon as a user begins working, or upon detection by a camera(s), the framework may cause the camera(s) to begin capturing footage of the user, which may be fed, uploaded and/or streamed to a fatigue detection system that determines fatigue data related to the user. Such fatigue data may be leveraged to control which jobs certain users are performing, while reassigning other users based on safety decisions formed from their respective fatigue data.

20 Claims, 10 Drawing Sheets

COMPUTERIZED SYSTEMS AND METHODS FOR CONTINUOUS AND REAL-TIME FATIGUE DETECTION BASED ON COMPUTER VISION ANALYSIS

FIELD OF TECHNOLOGY

The present disclosure generally relates to computer-based systems configured for computing devices programmed to perform continuous and real-time fatigue detection of individuals based on computer-vision based analysis of captured digital imagery of the individual's movements.

BACKGROUND OF TECHNOLOGY

Fatigue may be a factor in accidents occurring in the work place. Fatigue may result in lost resources, injuries to workers, and in some instances, death and/or dismemberment when operating dangerous machinery.

SUMMARY

According to some embodiments of the instant disclosure, described herein is an illustrative system for continuous and real-time fatigue detection of individuals. The system includes at least one edge device including at least one processor, where the at least one processor is in communication with a non-transitory computer readable medium having software instructions stored thereon, where, upon execution of the software instructions, the at least one processor is configured to: receive a sequence of images from a digital imaging device; where the sequence of images capture a sequence of positions in a movement performed by a user; utilize at least one behavior determination machine learning model to generate a plurality of movement measurements for each image in the sequence of images based at least in part on: the sequence of positions in the sequence of images, and at least one behavior determination machine learning layer including a plurality of behavior determination machine learning parameters trained to ingest the sequence of images and output the plurality of movement measurements according to training on historical images; determine, by the at least one processor, a plurality of movement features based at least in part on the plurality of movement measurements for each image in the sequence of images; utilize at least one fatigue score machine learning model to generate at least one fatigue score based at least in part on: the plurality of movement features, and at least one fatigue score layer including a plurality of fatigue score regression parameters trained to ingest the plurality of movement features and output the at least one fatigue score according to training on movement measurements; where the at least one fatigue score is indicative of a degree of fatigue exhibited in the sequence of positions of the movement performed by the user; and update at least one activity log associated with the user based at least in part on at least one fatigue score.

According to some embodiments, described herein is an illustrative method for continuous and real-time fatigue detection of individuals. According to some embodiments, a method is disclosed, which includes: receiving, by at least one processor, a sequence of images from a digital imaging device; where the sequence of images capture a sequence of positions in a movement performed by a user; utilizing, by the at least one processor, at least one behavior determination machine learning model to generate a plurality of movement measurements for each image in the sequence of images based at least in part on: the sequence of positions in the sequence of images, and at least one behavior determination machine learning layer including a plurality of behavior determination machine learning parameters trained to ingest the sequence of images and output the plurality of movement measurements according to training on historical images; determine, by the at least one processor, a plurality of movement features based at least in part on the plurality of movement measurements for each image in the sequence of images; utilizing, by the at least one processor, at least one fatigue score machine learning model to generate at least one fatigue score based at least in part on: the plurality of movement features, and at least one fatigue score layer including a plurality of fatigue score parameters trained to ingest the plurality of movement features and output the at least one fatigue score according to training based on training movement measurements; where the at least one fatigue score is indicative of a degree of fatigue exhibited in the sequence of positions of the movement performed by the user; and updating, by the at least one processor, at least one activity log associated with the user based at least in part on at least one fatigue score.

According to some embodiments, the one or more systems and/or methods for continuous and real-time fatigue detection of individuals further includes: receiving, by the at least one processor, at least one fatigue self-scoring from at least one computing device associated with the user; where the at least one fatigue self-scoring represents a user input defining a degree of fatigue associated with the movement; and retraining, by the at least one processor, the plurality of fatigue score parameters based at least in part on an error between the at least one fatigue self-score and the at least one fatigue score.

According to some embodiments, the one or more systems and/or methods for continuous and real-time fatigue detection of individuals further includes: generating, by the at least one processor, a fatigue risk alert associated with the user based at least in part on the at least one fatigue score being below a predetermined fatigue threshold; where the fatigue risk alert represents an increased risk of injury to the user due to fatigue; and transmitting, by the at least one processor, the fatigue risk alert to at least one computing device so as to provide an alert of the fatigue risk, where the fatigue risk alert is configured to cause the at least one computing device to render at least one graphical user interface element indicative of the fatigue risk alert.

According to some embodiments, the one or more systems and/or methods for continuous and real-time fatigue detection of individuals further includes, where the at least one computing device is associated with at least one manager in a workplace of the user.

According to some embodiments, the one or more systems and/or methods for continuous and real-time fatigue detection of individuals further includes: accessing, by the at least one processor, the at least one activity associated with the user; and determining, by the at least one processor, at least one activity adjustment recommendation based at least in part on the at least one fatigue score, where the at least one activity adjustment recommendation indicates a change to the movement of the user to decrease a risk of injury due to fatigue.

According to some embodiments, the one or more systems and/or methods for continuous and real-time fatigue detection of individuals further includes, where the at least one activity adjustment recommendation comprises at least one decreased activity period indicative of a decrease in at least one movement-related attribute; where the at least one movement-related attribute comprises at least one of: a movement intensity, and a movement frequency.

According to some embodiments, the one or more systems and/or methods for continuous and real-time fatigue detection of individuals further includes: determining, by the at least one processor, a user identifier associated with the user of the sequence of images based at least in part on at least one identifiable feature in at least one image of the sequence of images; and identifying, by the at least one processor, the at least one activity log associated with the user based at least in part on the user identifier.

According to some embodiments, the one or more systems and/or methods for continuous and real-time fatigue detection of individuals further includes: generating, by the at least one processor, a plurality of sub-sequences of images from the sequence of images; where each sub-sequence of images is associated with a window of time; utilizing, by the at least one processor for each sub-sequence of images, the at least one behavior determination machine learning model to generate the plurality of movement measurements for each image; determine, by the at least one processor for each sub-sequence of images, the plurality of movement features based at least in part on the plurality of movement measurements for each image; utilizing, by the at least one processor for each sub-sequence of images, the at least one fatigue score machine learning model to generate the at least one fatigue score; and updating, by the at least one processor for each sub-sequence of images, the at least one activity log associated with the user based at least in part on the at least one fatigue score for the window of time associated with each sub-sequence of images.

According to some embodiments, the one or more systems and/or methods for continuous and real-time fatigue detection of individuals further includes: determining, by the at least one processor, a statistical fatigue metric associated with a statistical aggregation of the at least one fatigue score for the window of time associated with each sub-sequence of images; determining, by the at least one processor, that the at least one fatigue score for a particular window of time associated with a particular sub-sequence of images exceeds a predetermined threshold value; generating, by the at least one processor, a fatigue risk alert associated with the user based at least in part on the at least one fatigue score being exceeding the predetermined threshold value; where the fatigue risk alert represents an increased risk of injury to the user due to fatigue; and transmitting, by the at least one processor, the fatigue risk alert to at least one computing device so as to provide an alert of the fatigue risk, where the fatigue risk alert is configured to cause the at least one computing device to render at least one graphical user interface element indicative of the fatigue risk alert.

According to some embodiments, the one or more systems and/or methods for continuous and real-time fatigue detection of individuals further includes: determining, by the at least one processor, at least one activity adjustment recommendation based at least in part on the statistical fatigue metric, where the at least one activity adjustment recommendation indicates a change to the movement of the user to decrease a risk of injury due to fatigue.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
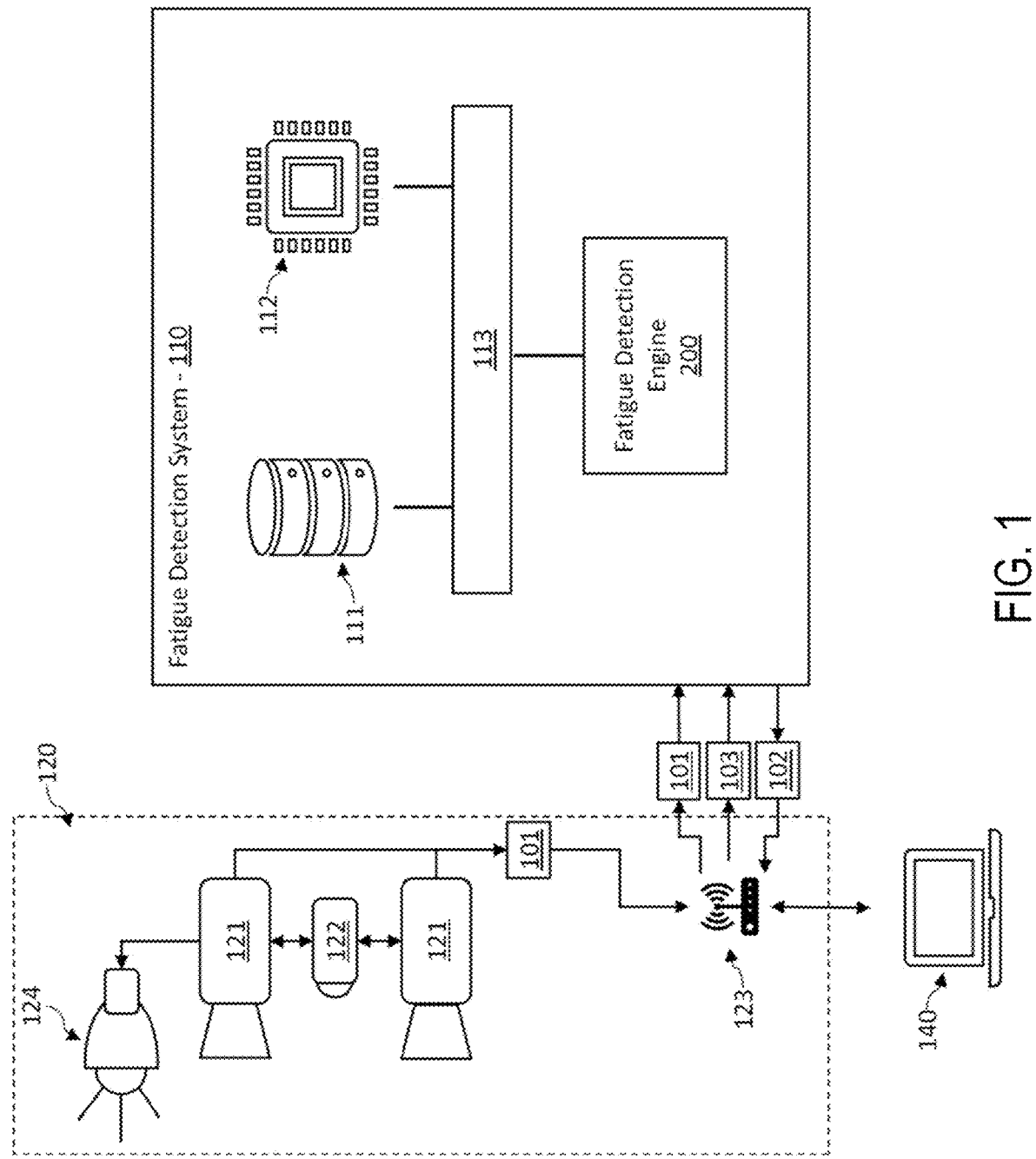
FIG. 1 is a block diagram of an example configuration within which the systems and methods disclosed herein could be implemented according to some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure is described below with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

For the purposes of this disclosure the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles of the instant disclosure will now be described in greater detail. According to some embodiments, in connection with the subject matter disclosed and depicted in FIGS. 1-9, the disclosed systems and methods provide a novel framework for performing management of a location and the individuals operating therein based on determined fatigue data of such individuals.

According to some embodiments, the disclosed systems and methods may track a person (referred to, as a user) at or around a location. Such tracking may be performed based on captured digital imagery of the user via a set of cameras at the location. For example, a location is a warehouse, and the user is performing their job at the location; therefore, the disclosed framework may execute and/or rely on data feeds of captured imagery from strategically positioned cameras to track the user and their movements within or around the warehouse.

According to some embodiments, as soon as a user begins working, or upon detection by a camera, the disclosed framework may cause a camera(s) to begin capturing footage of the user. The captured imagery may be fed, uploaded and/or streamed to the disclosed fatigue detection system 110 (e.g., and fatigue detection engine 200), as discussed infra, whereby a determination as to the fatigue levels of the user may be performed. According to some embodiments, such fatigue data may be leveraged to control which jobs certain users are performing, while reassigning other users based on safety decisions formed from their respective fatigue levels.

Accordingly, in some embodiments, the disclosed framework may determine fatigue scores from the image data by combining machine vision techniques and traditional machine learning algorithms. The framework may operate to perform continuous fatigue monitoring, via computer vision technologies, that enables real-time, continuous determinations as to the conditions of users working at a location, thereby ensuring a safe, secure and efficient work environment.

According to some embodiments, as discussed herein, the disclosed framework addresses many technological problems that currently exist within the current state of the art. That is, conventional systems focus on tracking a user's movements based on sensors worn by or adhered to users. This, therefore, restricts the capabilities of determining a user's movements to the devices the user is wearing; and, should the user not be wearing a specifically configured sensor to track their movements, movement data for the user becomes unavailable.

Moreover, even relying on a user's smartphone, which can include tracking sensors such as an accelerometer and gyroscope, not only is this data unreliable (e.g., in a user's pocket which cannot accurately track the user's movements (e.g., their arms, for example), it is entirely reliant on the user having their smartphone on their person.

The disclosed systems and methods, therefore, provide a novel framework that addresses these shortcomings, among others, by providing capabilities for not only tracking a user's movements, but also determining their current fatigue (or fitness) status based on captured digital imagery. That is, rather than relying on sensors attached or carried by a user, the disclosed technology is directed to determining movement data of a user via computer vision technology applied to captured imagery of the user. This enables a more streamlined, efficient and reliable system to ascertain how a user is moving, and in what manner such movements occurred. Further, the disclosed framework can increase efficiency and reduce resource reliance by avoiding the need for wearable sensors, while achieving movement data capture via the computational analysis of captured digital imagery. Thus, a reduction of device usage and increased efficiency and computational analysis accuracy may be achieved due to the mechanisms deployed by the disclosed framework, as detailed herein.

FIG. 1 is a block diagram of an exemplary computer-based system and platform for which they disclosed systems and methods may be implemented and/or executed therein.

In some embodiments, a fatigue detection system 110 is connected to cameras 121 in a location 120 of facility or other enclosure, such as, e.g., a warehouse, building, office, garage, healthcare facility, home, etc. In some embodiments, the cameras 121 in the location 120 may include multiple cameras 121 set at different mounting points with different view angles within the location 120. Thus, each camera 121 may provide a different view of the location 120 for a different angle or perspective of each point on a surface, such as a floor, ground or other walking surface within the location 120 (e.g., on scaffolding, on a ladder, within a shaft, and the like, for example). In some embodiments, to improve the view of each camera 121, the location 120 may include one or more light sources 124, such as, e.g., ceiling lighting, drop lighting, lamps, among other light sources 124 or any combination thereof.

In some embodiments, the different views of each camera 121 may be determined iteratively by automated and/or manual adjustment. In some embodiments, each camera 121 may be assigned to the particular location 120 and to particular area(s) within the location 120. Thus, each camera 121 may be adjusted to ensure that each camera 121 of the location 120 is directed to the particular area(s) to provide the different views. In some embodiments, the cameras 121 may be mounted on adjustable mounts to allow for manual or automated adjustment of each camera 121. In some embodiments, the adjustable mount or each camera 121 may include one or more ball joints, hinges, articulated members, tripods, wall plates, or other fixed or mobile mounting points with suitable attachment mechanisms.

In some embodiments, the adjustable mount of each camera 121 may include a motorized mount for automated adjustment of each camera 121. In some embodiments, each camera 121 in the location 120 may be interconnected to exchange data of the respective views of each camera 121. For example, in some embodiments, a first camera 121 may capture image data of the location 120 and automatically detect the area including, e.g., key points within the area (e.g., of landmarks and/or features of the area). In some embodiments, the first camera 121 may communicate data regarding the detected area and key points (e.g., a distance, an angle, etc. of the area with respect to the first camera 121) to a second camera 121. In some embodiments, the second camera 121 may automatically adjust its view to capture the same area in image data via detection of the key points and matching spatial locations to the key points in the image data of the first camera 121.

In some embodiments, interconnected cameras 121 in the location 120 may further make coordinated adjustments. In some embodiments, the first camera 121 may readjust orientation and/or zoom based on image data from the second camera 121, and vice versa. In some embodiments, the first and second cameras 121 may iteratively adjust orientation and/or zoom based on a two-way exchange of data to capture common areas and/or features of the location 120. In some embodiments, the fatigue detection system 110 may instruct the first and second cameras 121, as well as any other cameras 121 in the location 120 to adjust orientation and/or zoom based on the image communicated amongst the cameras 121.

In some embodiments, each camera 121 may provide image data 101, such as, e.g., image frames, periodic images, a continuous video feed, periodic video segments, or other form of image data 101. In some embodiments, the periodic images may be received on a periodic basis at predetermined intervals, such as, e.g., every 5 seconds, every 10 seconds, every 15 seconds, every 20 seconds, every 25 seconds, every 30 seconds, every 45 seconds, every minute, every 2 minutes, every 5 minutes, every 10 minutes, or other suitable interval. Similarly, the periodic video segments may include a video segment on a periodic basis at predetermined intervals, such as, e.g., every 5 seconds, every 10 seconds, every 15 seconds, every 20 seconds, every 25 seconds, every 30 seconds, every 45 seconds, every minute, every 2 minutes, every 5 minutes, every 10 minutes, or other suitable interval. Accordingly, in some embodiments, each camera 121 may include, e.g., a digital camera, image sensor, charge-coupled device (CCD), video camera, or other suitable image capturing device.

In some embodiments, the cameras 121 may include or be in connection with one or more sensor device(s) 122. For example, each camera 121 may include an integrated sensor device 122, an external wired sensor device 122, an external wireless sensor device 122 or any other suitable arrangement of a camera 121 with a sensor device 122. In some embodiments, the sensor device 122 may include a suitable sensor device 122 for facilitating adjustment and control of each camera 121. In some embodiments, the sensor device 122 may include, e.g., at least one particular light sensor. In some embodiments, the particular light sensor measures a light intensity of a light (e.g., sunlight, electrical lighting, ambient lighting, fire, etc.) in a particular area of the enclosure where a particular camera 121 is positioned. In some embodiments, using the light intensity, each camera 121 may automatically turn on or turn off. For example, where the light intensity of the light in the particular area of the enclosure is equal to or exceeds a predetermined threshold value corresponding a sufficient amount of light intensity to recognize a person and/or the person's movements, the associated cameras 121 may turn on and capture one or more images of the location 120. Similarly, where the light intensity falls below the predetermined threshold value, the associated camera(s) 121 may automatically turn off.

In some embodiments, the predetermined threshold value of the light intensity may include, e.g., 1 milli-may dela per meter squared ($mcd/m^2$), 1.4 $mcd/m^2$, 5 $mcd/m^2$, 40 $mcd/m^2$, 2 may dela per meter squared ($cd/m^2$), 5 $cd/m^2$, 25 $cd/m^2$, 30 $cd/m^2$, 55 $cd/m^2$, 80 $cd/m^2$, 250 $cd/m^2$, 700 $cd/m^2$, 2 kilo-may dela per meter squared ($kcd/m^2$), 2.5 $kcd/m^2$, 5 $kcd/m^2$, 7 $kcd/m^2$, 10 $kcd/m^2$, 12 $kcd/m^2$, or greater luminance of the location 120.

In some embodiments, alternatively or additionally, the camera(s) 121 associated with a particular light sensor may adjust operation based on the light intensity detected by the light sensor. For example, in some embodiments, the camera(s) 121 may scale, e.g., aperture, exposure time, International Organization for Standardization (ISO) speed, or any other suitable image capturing parameter or any suitable combination thereof. Additionally, or alternatively, the light sensor may be employed to adjust operation of a light source 124. For example, where light intensity falls below the predetermined value, the light sensor may trigger the light source 124 to activate and/or increase in brightness. Similarly, where the light intensity exceeds a second predetermined threshold value, the light sensor may trigger the light source 124 to deactivate and/or decrease in brightness. In some embodiments, the light source 124 may automatically scale in brightness in response to the light intensity detected by the light sensor.

In some embodiments, instead of or in addition to the light sensor, light intensity in the location 120 may be determined based on captured image data from one or more cameras 121 of the cameras 121 in the location 120. In some embodiments, for example, a pixel intensity of one or more pixels may be determined based on pixel values of a captured image. In some embodiments, the light intensity of the location 120 may be determined based on, e.g., an average pixel intensity across all pixels in a given image, a summed pixel intensity across all pixels in a given image, a peak pixel intensity across all pixels in a given image, a sample average pixel intensity across a sample of pixels in a given image, a sample sum pixel intensity across a sample of pixels in a given image, a peak sample average pixel intensity of a highest average pixel intensity between all samples of pixels in a given image, a peak sample sum pixel intensity of a highest sum of pixel intensity between all samples of pixels in a given image, or any other suitable methodology for determine light intensity in the location 120 based on pixel values of each image captured.

In some embodiments, the sensor device 122 may include any other suitable sensor device for adjusting the operation of the cameras 121, such as, e.g., a motion detection sensor. Accordingly, in some embodiments, a motion detection sensor may be employed to trigger activation of the cameras upon detection of motion.

In some embodiments, the image data 101 captured by the cameras 121 may be communicated to the fatigue detection system 110 directly (via wireless and/or wired connection(s) and/or networks) and/or via one or more communication beacons 123. In some embodiments, the communication beacon 123 may include, e.g., a WiFi router, a WiFi access point, a Bluetooth radio, a Zigbee access point, a Z-Wave access point, or any other suitable wireless beacon or any combination thereof. In some embodiments, the communication beacon 123 may include, e.g., one or more wired connections, such as, e.g., ethernet, fiber optic, universal serial bus (USB), or other suitable wired communication or any combination thereof.

In some embodiments, the communication beacon 123 may communicate with the fatigue detection system 110 via a direct and/or networked connection. In some embodiments, the network may include any suitable computer network, including, two or more computers including the communication beacon 123 and the fatigue detection system 110 and/or other computer devices that are connected with one another for the purpose of communicating data electronically. In some embodiments, the network may include a suitable network type, as discussed supra.

In some embodiments, the fatigue detection system 110 may receive the image data 101 for automated detection of user movement in each image of the location 120 provided by each camera 121. In some embodiments, the fatigue detection system 110 may be a part of the user device 140. Thus, the fatigue detection system 110 may include hardware and software components including, e.g., user device 140 hardware and software, cloud or server hardware and software, or a combination thereof.

In some embodiments, the fatigue detection system 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

In some embodiments, the fatigue detection system 110 may include one or more computer devices implemented as a local or on-premises computing system, a cloud computing system or hybrid cloud computing system having one or more hardware and/or software components located in a cloud computing system and one or more hardware and/or software components located in a local computing system. In some embodiments, "cloud," "Internet cloud," "cloud computing," "cloud architecture," and similar terms may include at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

Similarly, the fatigue detection system 110 may include storage 111, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 111 may include, e.g., a suitable non-transient computer readable medium such as, e.g., random access memory (RAM), read only memory (ROM), one or more buffers and/or caches, among other memory devices or any combination thereof.

In some embodiments, the fatigue detection system 110 may implement computer engines (and/or modules) for detection of user movement and fatigue determinations in and/or around the location 120 and provide an alert to user devices 140 to warn of fatigued users. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the fatigue detection system 110 may include fatigue detection engine 200. In some embodiments, fatigue detection engine 200 may include a dedicated and/or shared software components, hardware components, or a combination thereof. In some embodiments, the fatigue detection engine 200 may utilize hardware resources, including the processor 112 and storage 111 of the fatigue detection system 110 via, e.g., a bus 113.

In some embodiments, the fatigue detection engine 200 may iteratively store the particular images captured at location 120 and processed by system 100 in a storage 111 (e.g., database). In some embodiments, such stored data may be related to detected, identified and/or determined users at the location, movements of such users, and/or any other type of information identified, determined or otherwise derived during the processing discussed below in relation to at least FIGS. 4-5.

In some embodiments, persistent and long term record keeping of fatigue data may be advantageous and/or desired, e.g., for future risk, insurability, compensation, model training, or other use or any combination thereof. Accordingly, in some embodiments, storage 111 may include, e.g., a distributed ledger system, such as, e.g., blockchain.

In some embodiments, a blockchain may include one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the fatigue detection system 110 may additionally employ a motion recognition machine learning model. In some embodiments, where the sensor device 122 includes a motion detection sensor, the image data 101 may include one or more tags on one or more image frames of the visual input where the motion detection sensor detects motion. In some embodiments, the tag may cause the fatigue detection system 110 to process the tagged image frames with the motion recognition machine learning model. In some embodiments, the motion recognition machine learning model may receive each image frame of the visual input and process the image frames as a sequence with a suitable movement recognition model, such as, e.g., a computer vision model, recurrent neural network or other suitable neural network from processing time-series data.

In some embodiments, the motion recognition machine learning model ingest each image frame of the visual input and process each image frame to detect one or more body parts of a person. In some embodiments, the motion recognition machine learning model may track each body part through time by detecting the one or more body parts through successive image frames of the visual input. In some embodiments, the motion recognition machine learning model may employ a suitable neural network for object detection, recognition and/or tracking in the visual input, such as, e.g., MoveNet, or other suitable computer vision and/or neural network technology.

In some embodiments, the motion recognition machine learning model may detect and track body posture via multiple key points on the body, such as, e.g., 10, 12, 15, 17, 20, 22, 25 or more key points. In some embodiments, one of the key points may include, e.g., a neck point marking a location in an image frame of the neck of the body, and an ankle point marking a location in the image frame of the ankle of the body.

In some embodiments, the motion recognition machine learning model may create a bounding box of the body around the body in each image frame. In some embodiments, the bounding box may be defined by a width and a height within each image frame, where the height is defined by a highest point of the body within a vertical axis of the image frame and a lowest point of the body within the vertical axis of the image frame, and where the width is defined by a left-most point of the body within a horizontal axis of the image frame and a right-most point of the body within the horizontal axis of the image frame.

In some embodiments, fatigue detection system 110 may iteratively instruct the beacon 123 to transmit, to the user device 140 associated with at least one user, at least one instruction 102 to display on a graphical user interface of the user device 140. In some embodiments, the instruction 102 include an indication of an interface element, as discussed below and depicted in relation to FIGS. 3A-3B.

Figure 2:
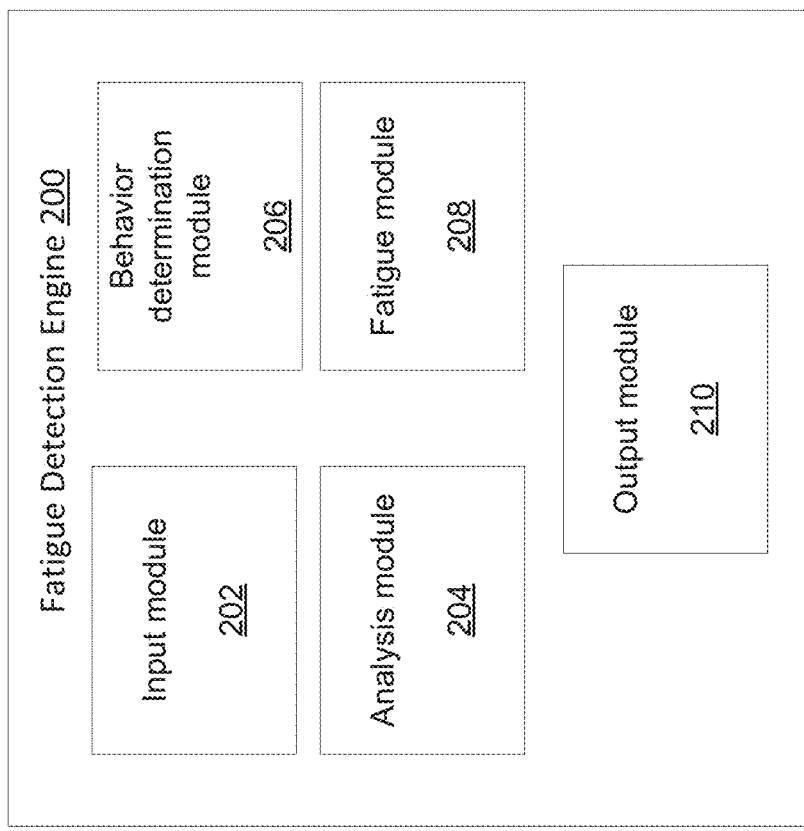
FIG. 2 is a block diagram illustrating components of an exemplary system according to some embodiments of the present disclosure.

As illustrated in FIG. 2, according to some embodiments, fatigue detection engine 200 includes image input module 202, analysis module 204, behavior determination module 206, fatigue module 208 and output module 210. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 4-5, inter alia.

Figure 3A:
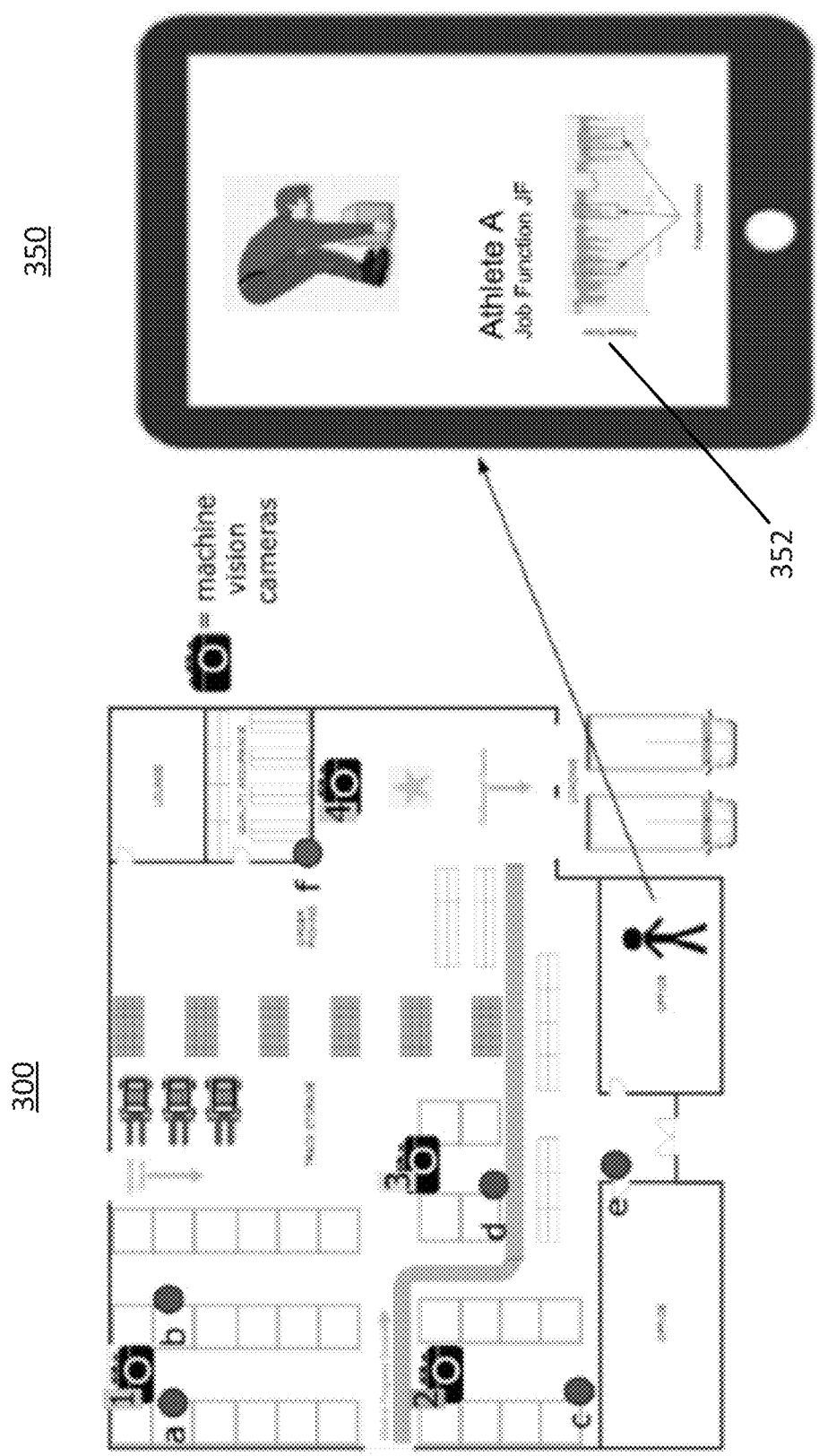
FIGS. 3A-3B provide non-limiting example embodiments of implementations of the disclosed systems and methods according to some embodiments of the present disclosure.
Figure 3B:
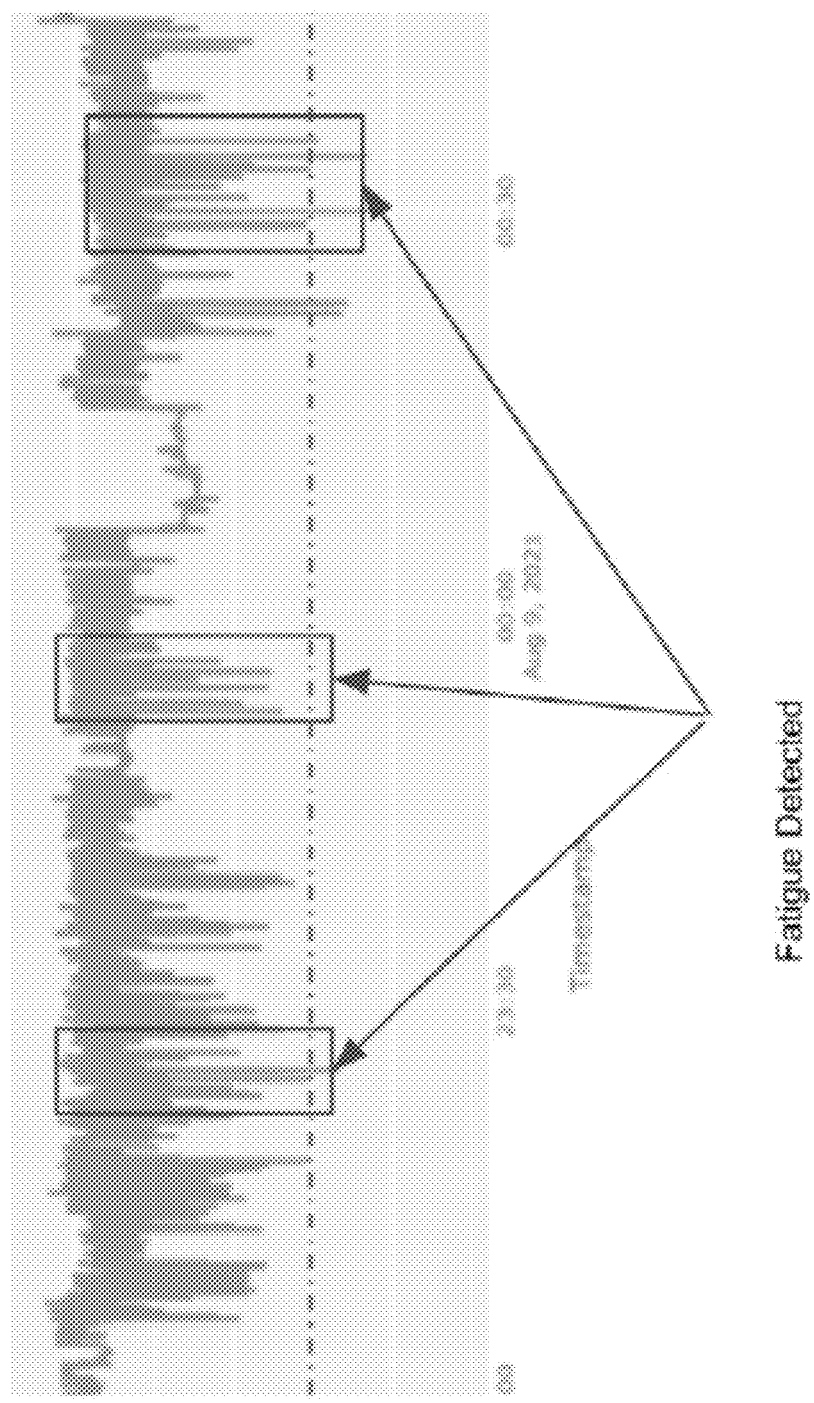

Turning to FIG. 3A, illustrated are enclosure 300 and device 350. In FIG. 3A, enclosure 300 provides a non-limiting example of a location, for example, a warehouse. The enclosure 300 may be monitored for purposed of executing the disclosed fatigue detection technology. In some embodiments, the warehouse 300 may include multiple locations, for example: a, b, c, d, e and f. In some embodiments, locations a, b, c, d, e and f may be within the view of multiple cameras 1, 2, 3 and 4 to provide imagery of each location a, b, c, d, e and f from different angles. Thus, based on the determine fatigue scoring of a user and/or determined fatigue risk computation, e.g., at location f by camera 4, a user may be provided with a graphical user interface including the image with fatigue information for a user. Thus, display 350 is provided which depicts a non-liming example of a notification providing a user's (e.g., worker's) fatigue level. For example, as illustrated in FIG. 3B, fatigue mapping 352 may provide examples of the user's fatigue over a period of time.

Figure 4:
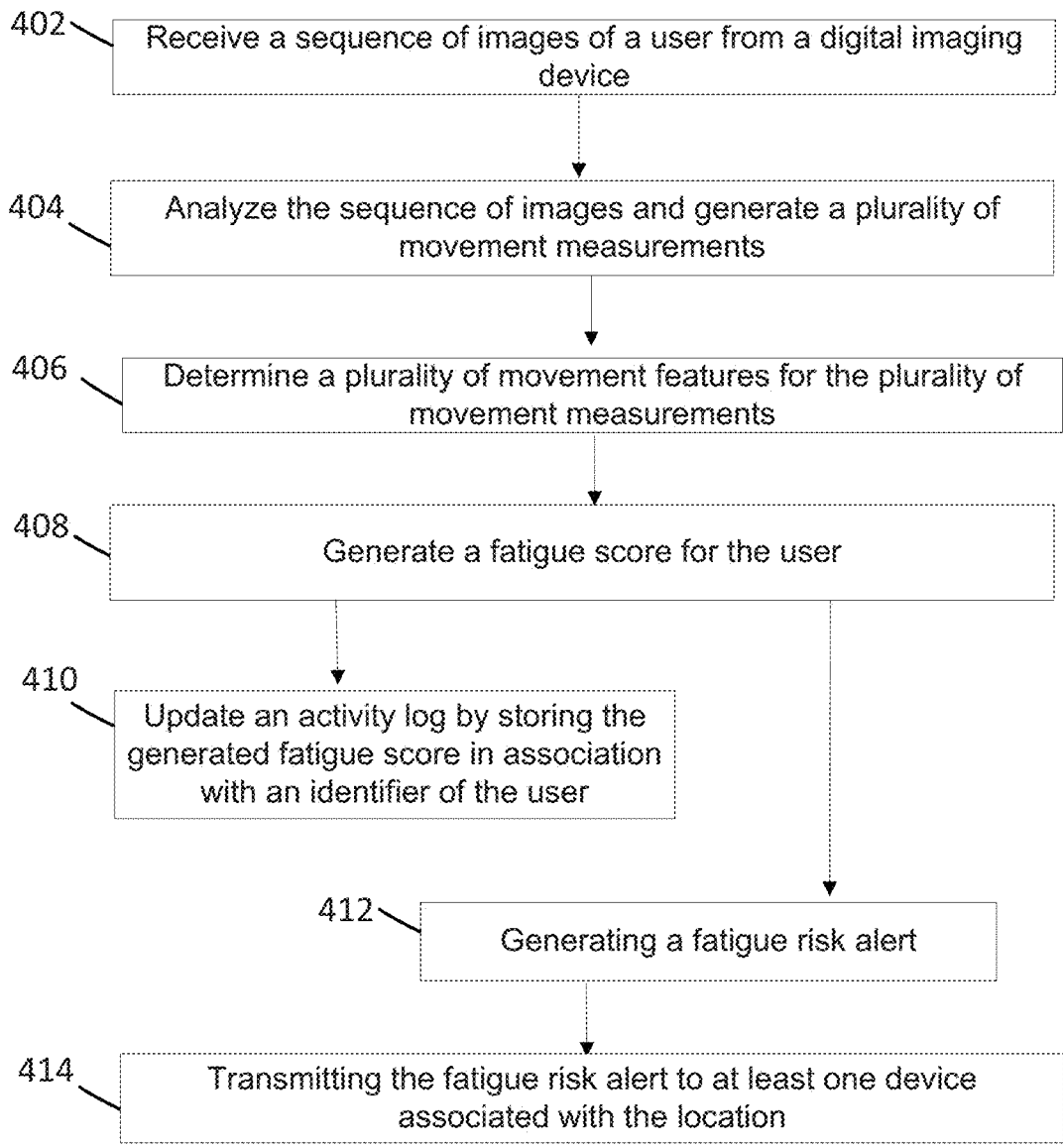
FIG. 4 illustrates an exemplary work flow according to some embodiments of the present disclosure.

Turning to FIG. 4, Process 400 is provided which discloses non-limiting example embodiments for controlling and managing a location and the individuals operating therein based on determined fatigue data of such individuals. The framework may track a user at or around a location. Such tracking may be performed based on captured digital imagery of the user via a set of strategically positioned cameras at the location. In some embodiments, as soon as a user begins working, or upon detection by a camera(s), the framework may cause the camera(s) to begin capturing footage of the user, which may be fed, uploaded and/or streamed to a fatigue detection system that determines fatigue data related to the user. Such fatigue data may be leveraged to control which jobs certain users are performing, while reassigning other users based on safety decisions formed from their respective fatigue data.

According to some embodiments, Step 402 of Process 400 may be performed by input module 202 of the fatigue detection engine 200; Step 404 may be performed by analysis module 204; Step 406 may be performed by behavior determination module 206; Steps 408 and 412 may be performed by fatigue module 208; and Steps 410 and 414 may be performed by output module 210.

According to some embodiments, Process 400 may begin with Step 402 where a sequence of images of a user are received. According to some embodiments, as discussed above, the sequence (or set) of images may correspond to captured images or video (e.g., image frames) of the user's movements at/around a location. Thus, the images may capture a sequence of potions in a movement performed by a user (e.g., picking up a box, walking from an initial position to a destination, operating a piece of machinery, and the like).

According to some embodiments, as discussed above, Step 402 may be based on detection, by engine 200 and/or an associated camera (e.g., 121) that detects the user within a captured image frame and begins recording the user's movements based on such detected motion.

In Step 404, engine 200 may analyze the sequence of images, and generate a plurality of movement measures. According to some embodiments, engine 200 may generate a plurality of movement measurements for each image in the sequence of images. In some embodiments, the plurality of movement measurements may be based on, but not limited to, the sequence of positions in the sequence of images, and at least one behavior determination machine learning layer that includes a plurality of behavior determination machine learning parameters trained to ingest the sequence of images and output the plurality of movement measurements according to training on historical images.

Accordingly, in some embodiments, engine 200 may implement any type of known or to be known computational analysis technique to determine and/or generate the movement measurements of the user from the sequence of images, including, but not limited to, computer vision, recurrent neural networks, and the like.

According to some embodiments, for example, engine 200 may execute a pose estimation computer vision technology that detects human motion in images and videos and enables identification of the human body parts based therefrom. For example, such technology may enable engine 200 to identify a person's elbow, and track how the elbow moves and/or bends with the depicted content of the images. In some embodiments, such movement measurements may be stored as keypoints or keypoint data structures that provide movement values and measurements.

In Step 406, engine 200 may determine a plurality of movement features based at least in part on the plurality of movement measurements for each image in the sequence of images. Accordingly, in some embodiments, engine 200's movement feature determination may be based on the measurements from step 404, whereby the key points and/or values associated therewith may provide indicators as to the features of the particularly detected movement(s).'

According to some embodiments, Step 406 may involve using the output from the pose estimation performed in Step 404 to determine the angles and velocities of the human motion of the user depicted in the images. According to some embodiments, such determined movement features may correspond to or be based on data that may include, but is not limited to, a timestamp; and at least one of displacement of the torso joints from the initial position (e.g., previous image) to the new position in three dimensions; the velocities of the above displacements; the accelerations of the above displacements; the angular velocities of the above displacements; the overall time taken to do a task, such as, but not limited to, a bend, twist, reach above the head, and the like; the statistical measures of all the above metrics, such as, but not limited to, average, median, max, min, variance, and the like; and the like, or some combination thereof.

In some embodiments, based on this data, engine 200 may divide the video into n-minute windows and calculate the plurality of movement features. That is, the sequence of images (from Step 402) may be analyzed, whereby n-minute windows may be computed from the movement measurement data; whereby engine 200 may be programmed to splice the images accordingly. In some embodiments, for example, specific movements (e.g., moving boxes) may be associated with $n_1$ window, whereas another movement (e.g., climbing a ladder) may be associated with $n_2$ window. Thus, as discussed herein, it should be understood that the processing of Process 400 may be performed for subsequences, as well as other forms of sequences determined from the sequence of images received in Step 402.

As such, in some embodiments, Step 406 may further involve a variety of time-domain and/or frequency-domain features. For example, for each n-minute window of data, the following calculations may be performed: Mean, Standard Deviation, Variance, Entropy (Uncertainty), Average of Maximum and Minimum value, Number of peaks in the FFT signal, Number of peaks in the PSD signal, Number of peaks in the Auto-Correlation signal, X and Y coordinates of first m (e.g., 5) peaks in each of the above signals, and the like.

In Step 408, engine 200 may determine and generate a fatigue score for the user, which is indicative of a degree of fatigue exhibited in the sequence of positions of the movement performed by the user. Such fatigue score may be based on the plurality of movement features (from Step 406), and at least one fatigue score layer of a fatigue score machine learning model(s) that includes a plurality of fatigue score parameters trained to ingest the plurality of movement features and output the at least one fatigue score according to training based on training movement measurements. In some embodiments, a fatigue score machine learning model may involve any type of known or to be known machine learning or artificial intelligence regression algorithm, such as, but not limited to, logistic regression, linear regression, stepwise regression, multivariate adaptive regression splines (MARS), least squares regression (LSR), neural networks, random forest, and the like, whereby the metrics of the movements from Step 406 may be provided as input to create the fatigue score.

According to some embodiments, the generated fatigue score may be based on fatigue information provided by the user. In some embodiments, Step 408 may additionally or alternatively involve receiving at least one fatigue self-scoring from a device associated with the user, where the at least one fatigue self-scoring represents a user input defining a degree of fatigue associated with the movement. Thus, the fatigue score may be based on such input, whereas engine 200 may retrain the plurality of fatigue score parameters based at least in part on an error between the at least one fatigue self-score and the at least one fatigue score (e.g., the score generated in Step 408, supra).

In Step 410, upon the fatigue score being generated, engine 200 may be programmed to execute an update to an activity log by storing the fatigue score in association with information related to the user (e.g., a user identifier (ID)). For example, the fatigue score may be stored along with the user ID as a data structure in a look-up table (LUT) or blockchain. Accordingly, Step 410 may involve engine 200 communicating with a database (e.g., database 111, from FIG. 1) for storage of the determined information related to the user's fatigue.

According to some embodiments, Step 410 may involve determining the identity of the user within the sequence of images based at least in part on at least one identifiable feature in at least one image of the sequence of images (e.g., perform facial recognition, biometric screen, and the like, to identify the user from the digital content depicted in the sequence of images). In some embodiments, the identity may be mapped to the user ID of the user, which may be leveraged to identify the activity log associated with the user.

In Step 412, engine 200 may determine and generate a fatigue risk alert. That is, according to some embodiments, the fatigue score generated in Step 408 is compared against a fatigue threshold. The fatigue threshold (e.g., a predetermined threshold value) corresponding to a value or metric that provides a baseline as to a maximum level of fatigue a user may have in order for them to perform their assigned task in a safe and efficient manner. In some embodiments, the fatigue threshold may be specific to, but is not limited to, a user, a task, a location, a time or date (e.g., a time of day, for example) and the like, or some combination thereof.

According to some embodiments, when the comparison of the fatigue score is above the fatigue threshold, engine 200 may generate a fatigue risk alert indicating that the user may be currently operating a task(s) in a dangerous manner (e.g., their fatigue is above the fatigue threshold). For example, the user may be too tired or fatigued (e.g., exhausted) to perform the operations of the task properly to ensure they are done correctly and safely.

In some embodiments, a fatigue risk alert may comprise a generated user interface (UI) or user interface elements that depict the current (or tracked) movements of the user, and measured fatigue values of the user. An example of this is depicted in FIGS. 3A-3B, as represented by display 350 and fatigue mapping 352.

In some embodiments, when the user's fatigue score is at or below the fatigue threshold, the user may be determined not too fatigued to perform their current task; therefore, the fatigue risk alert may be generated to depict such information. In some embodiments, such alert may indicate the current (or tracked) movements of the user.

According to some embodiments, Steps 408 and 412 may involve determining a statistical fatigue metric associated with a statistical aggregation of the at least one fatigue score for a window of time associated with each sub-sequence of images. Engine may then determine that the at least one fatigue score for a particular window of time associated with a particular sub-sequence of images exceeds a predetermined threshold value, whereby engine 200 may then generate a fatigue risk alert associated with the user based at least in part on the at least one fatigue score being exceeding the predetermined threshold value of a fatigue threshold.

In Step 414, engine 200 may transmit the fatigue risk alert to at least one device associated with the location. In some embodiments, the alert may be sent to, but not limited to, a manager of the user, a manger of the jobsite, a manager of the location, any administrator of the location or workplace, other users determined in the vicinity of the user, the user being tracked, and the like, or some combination thereof.

For example, Step 414 may involve, for a fatigue risk alert indicating that the user is at risk due to their fatigue level being above the fatigue threshold, identifying a current location of other users within a predetermined distance to the user (e.g., a closest user), and alerting them to the user's condition; whereby such alert may include a request to assist or take over the user's task until a reassignment may occur.

In some embodiments, as discussed below in relation to Process 500 of FIG. 5, the transmitted fatigue risk alert may comprise information related to a recommendation. In some embodiments, engine 200 may determine at least one activity adjustment recommendation based at least in part on a statistical fatigue metric of the user (and/or the fatigue risk alert), whereby the at least one activity adjustment recommendation indicates a change to the movement of the user to decrease a risk of injury due to fatigue.

Figure 5:
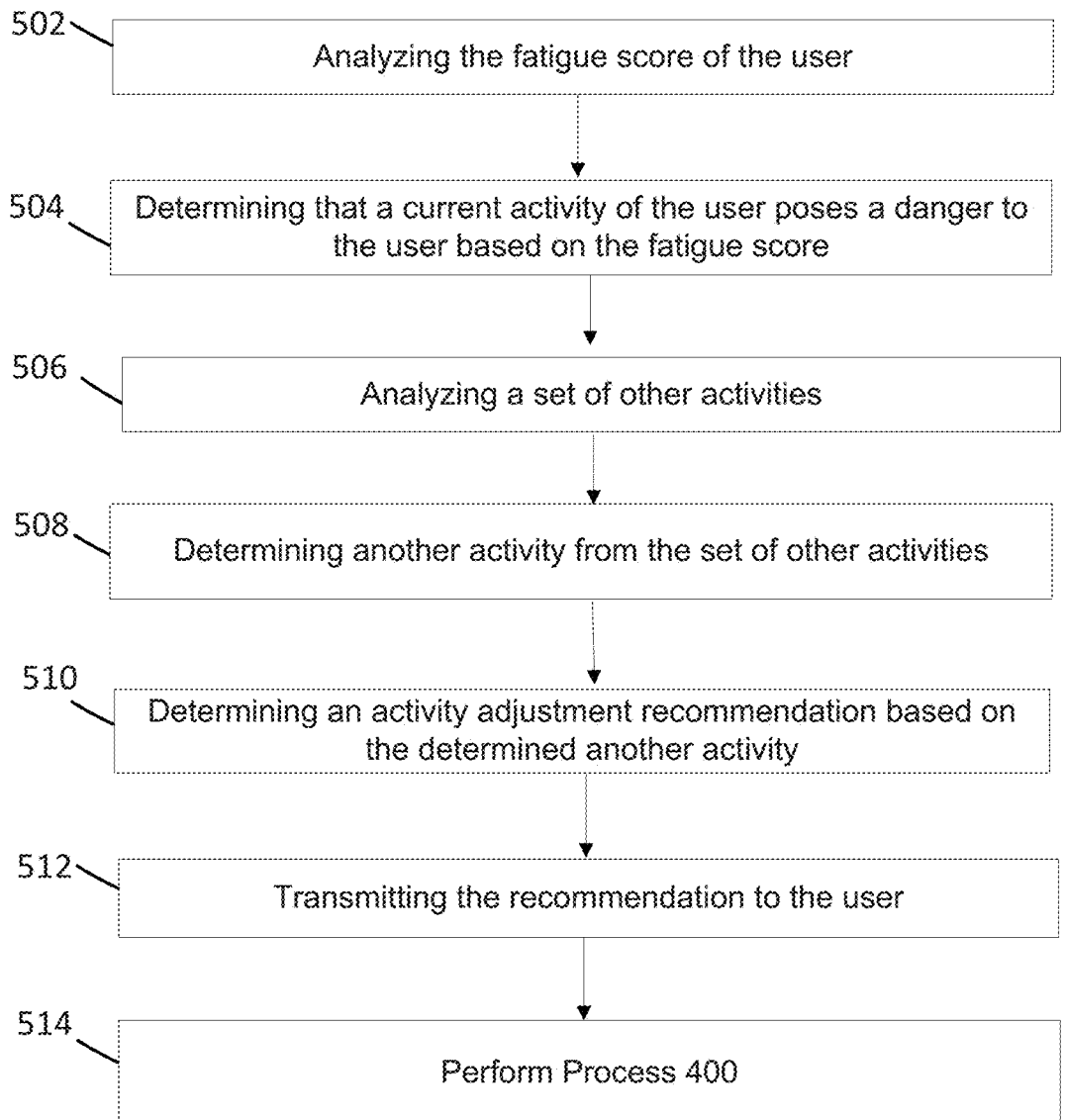
FIG. 5 illustrates an exemplary work flow according to some embodiments of the present disclosure.

Turning to FIG. 5, Process 500 is provided which discloses non-limiting example embodiments for recommending an alternative task or movement to a user based on a determination that their fatigue score indicates a risk to injury and/or improper or inefficient operation of a task.

According to some embodiments, Steps 502 and 506 of Process 500 may be performed by analysis module 204 of fatigue detection engine 200; Steps 504 and 508-510 may be performed by determination module 206; Step 512 may be performed by output module 208; and Step 514 may be performed according to the modules of engine 200 discussed above in relation to Process 400.

According to some embodiments, Process 500 begins with Step 502 where the fatigue score the user is analyzed. Such analysis may involve accessing and searching the activity log of the user and extracting the current (or latest) fatigue score for the user.

In Step 504, a determination is made regarding whether the current activity of the user poses a danger to the user (or other users) based on the fatigue score. The operations of Steps 502-504 may be performed in a similar manner as discussed above in relation to at least Steps 408 and 412, supra.

In Step 506, upon determining that the user is not fit for performing the currently assigned activity, engine 200 may analyze a set of other activities that may be assigned to other users at the location (e.g., other jobs or tasks that are not currently being performed or may be performed by the user).

In Step 508, engine 200 may determine another activity from the set of other activities. Such determination may involve, based on the analysis, identifying fatigue thresholds for the set of activities, and selecting an activity with a fatigue threshold at a maximum differential value from the user's currently determined fatigue score. This may ensure that the user has ample bandwidth for growing more fatigued while ensuring the tasks of the activity may be safely performed.

In Step 510, based on the determined another activity, engine 200 may determine at least one activity adjustment recommendation for the user, which indicates a change to the movement of the user to decrease a risk of injury due to fatigue.

In some embodiments, the at least one activity adjustment recommendation may include information related to at least one decreased activity period indicative of a decrease in at least one movement-related attribute, where such attribute may correspond to a movement intensity and/or a movement frequency.

In Step 512, this recommendation(s) may be sent to a device of the user. In some embodiments, the recommendation may also be sent to other users at or associated with the location (e.g., managers, other users, and the like).

At the conclusion of Step 512, engine 200 may recursively proceed to Step 402 of Process 400 to continue tracking of the user's movements related to the newly recommended activity.

Figure 6:
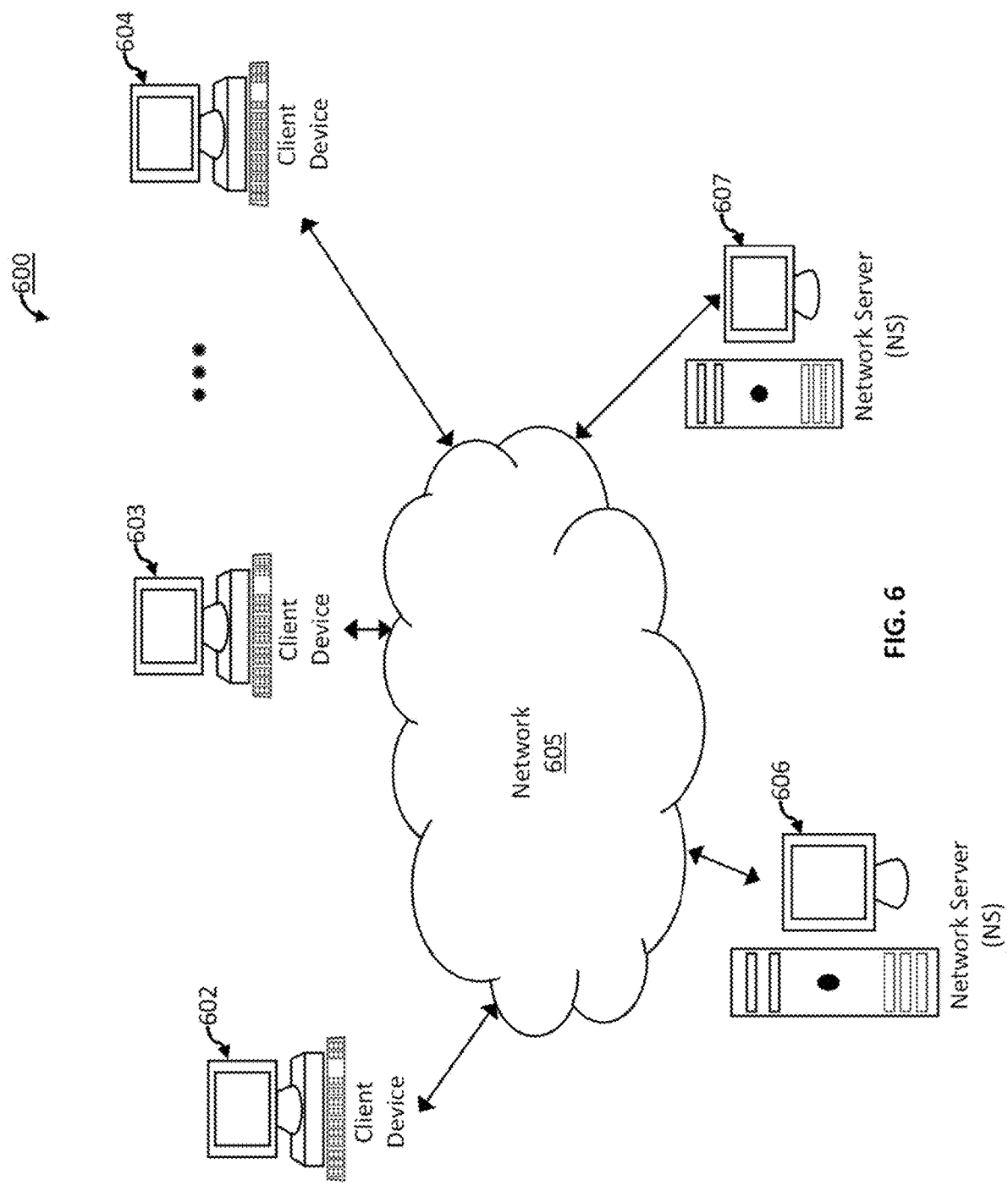
FIG. 6 is a block diagram depicting an exemplary computer-based system according to some embodiments of the present disclosure.

FIG. 6 depicts a block diagram of an exemplary computer-based system and platform 600 via a workflow service (and/or microservice) of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, member computing device 602, member computing device 603 through member computing device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, and the like). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++, Python, PHP and/or other suitable programming language. In some embodiment of the device software, device control may be distributed between multiple standalone applications. In some embodiments, software components/applications may be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 602-604 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, and the like. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
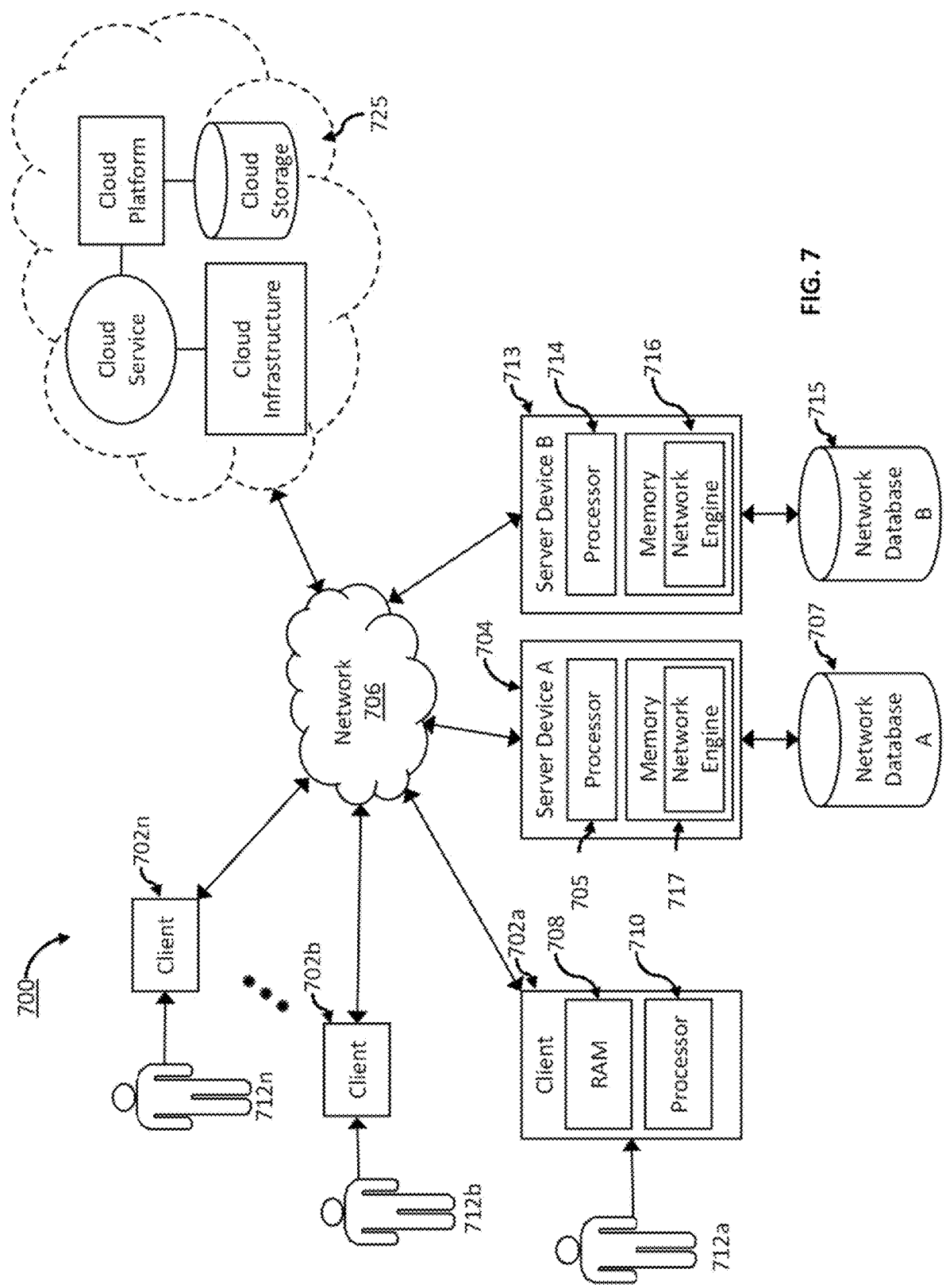
FIG. 7 depicts a block diagram of another exemplary computer-based system and platform according to some embodiments of the present disclosure.

FIG. 7 depicts a block diagram of another exemplary computer-based system and platform 700 via a workflow service (and/or microservice) of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 702a, member computing device 702b through member computing device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and the like.

In some embodiments, member computing devices 702a through 702n may also include a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™, Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS).

In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
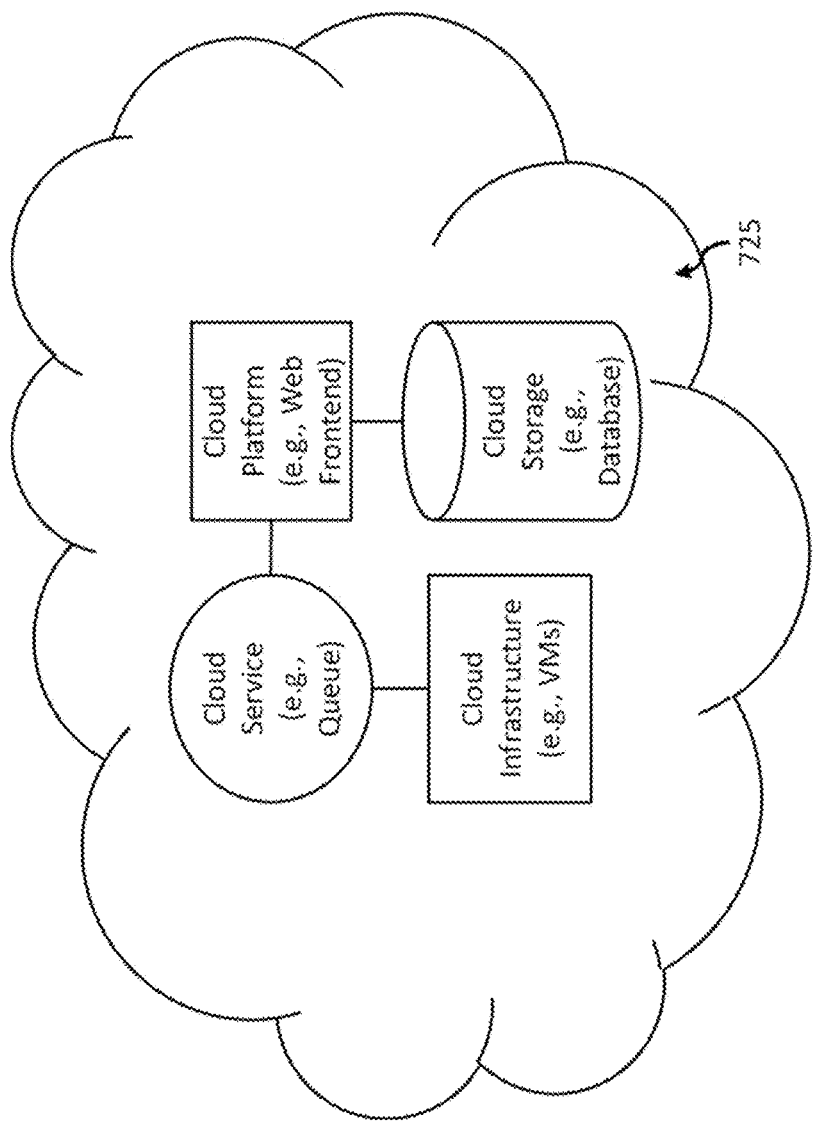
FIG. 8 depicts illustrative schematics of an exemplary implementation of the cloud computing/architecture(s) according to some embodiments of the present disclosure.
Figure 9:
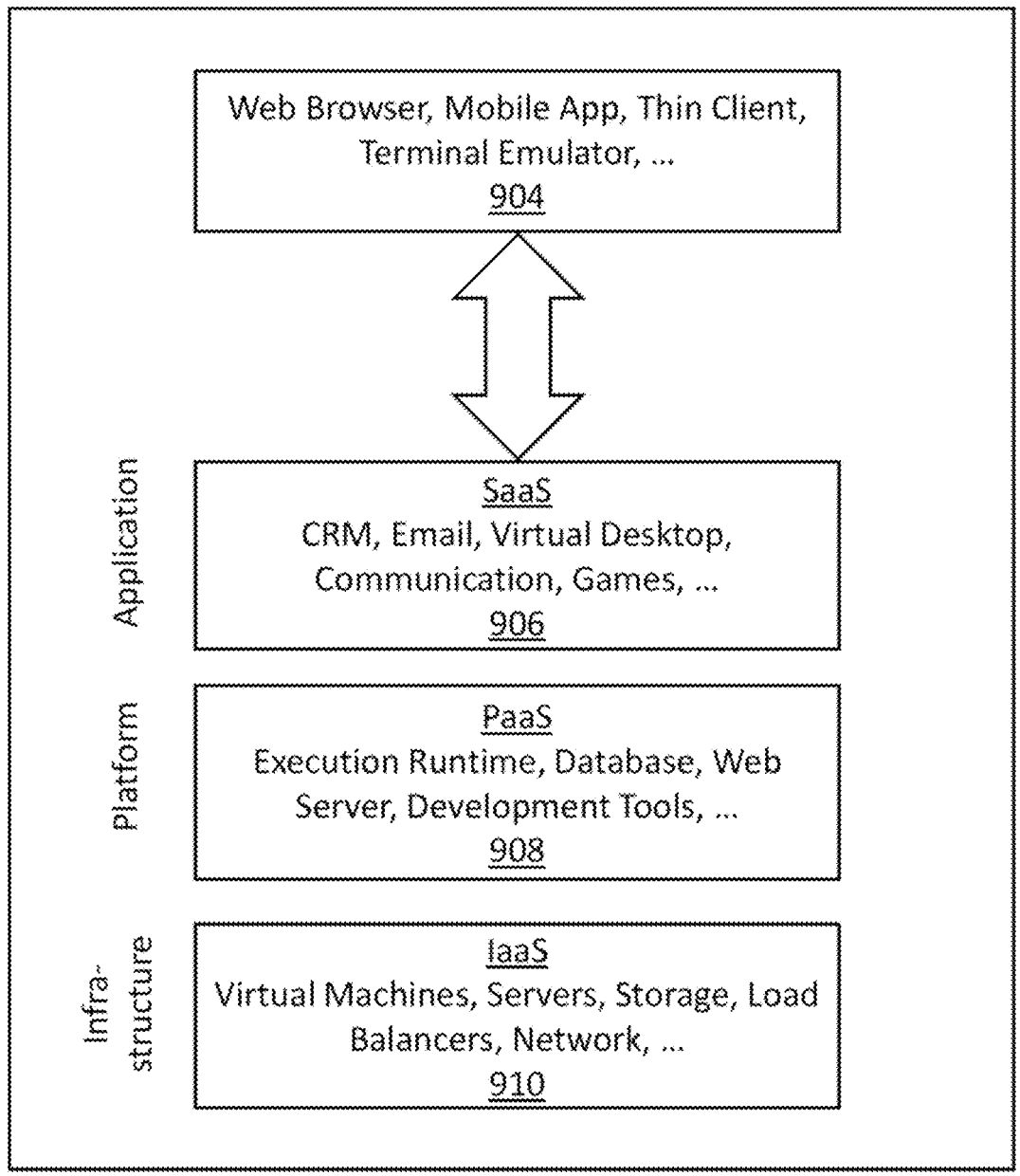
FIG. 9 depicts illustrative schematics of another exemplary implementation of the cloud computing/architecture(s) according to some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems for administrative customizations and control of network-hosted and/or blockchain-related APIs via a workflow service (and/or microservice) of a blockchain environment of the present disclosure may be specifically configured to operate.

It is understood that at least one aspect/functionality of various embodiments described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device)

occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, and the like.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, and the like), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., and the like). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

The aforementioned examples are, of course, illustrative, and not restrictive.

At least some aspects of the present disclosure will now be described with reference to the following numbered clauses.

1. A system including:
at least one edge device including at least one processor, where the at least one processor is in communication with a non-transitory computer readable medium having software instructions stored thereon, where, upon execution of the software instructions, the at least one processor is configured to:
receive a sequence of images from a digital imaging device;
where the sequence of images capture a sequence of positions in a movement performed by a user;
utilize at least one behavior determination machine learning model to generate a plurality of movement measurements for each image in the sequence of images based at least in part on:
the sequence of positions in the sequence of images, and
at least one behavior determination machine learning layer including a plurality of behavior determination machine learning parameters trained to ingest the sequence of images and output the plurality of movement measurements according to training on historical images;
determine, by the at least one processor, a plurality of movement features based at least in part on the plurality of movement measurements for each image in the sequence of images;
utilize at least one fatigue score machine learning model to generate at least one fatigue score based at least in part on:
the plurality of movement features, and
at least one fatigue score layer including a plurality of fatigue score regression parameters trained to ingest the plurality of movement features and output the at least one fatigue score according to training on movement measurements;
where the at least one fatigue score is indicative of a degree of fatigue exhibited in the sequence of positions of the movement performed by the user;
update at least one activity log associated with the user based at least in part on at least one fatigue score.

2. The system of clause 1, where, upon execution of the software instructions, the at least one processor is further configured to:
receive at least one fatigue self-scoring from at least one computing device associated with the user;
where the at least one fatigue self-scoring represents a user input defining a degree of fatigue associated with the movement; and
retrain the plurality of fatigue score parameters based at least in part on an error between the at least one fatigue self-score and the at least one fatigue score.

3. The system of clause 1, where, upon execution of the software instructions, the at least one processor is further configured to:
generate a fatigue risk alert associated with the user based at least in part on the at least one fatigue score being below a predetermined fatigue threshold;
where the fatigue risk alert represents an increased risk of injury to the user due to fatigue; and
transmit the fatigue risk alert to at least one computing device so as to provide an alert of the fatigue risk, where the fatigue risk alert is configured to cause the at least one computing device to render at least one graphical user interface element indicative of the fatigue risk alert.

4. The system of clause 3, where the at least one computing device is associated with at least one manager in a workplace of the user.

5. The system of clause 1, where, upon execution of the software instructions, the at least one processor is further configured to:

access the at least one activity associated with the user; and determine at least one activity adjustment recommendation based at least in part on the at least one fatigue score, where the at least one activity adjustment recommendation indicates a change to the movement of the user to decrease a risk of injury due to fatigue.

6. The system of clause 5, where the at least one activity adjustment recommendation comprises at least one decreased activity period indicative of a decrease in at least one movement-related attribute;

where the at least one movement-related attribute comprises at least one of:

a movement intensity, and a movement frequency.

7. The system of clause 1, where, upon execution of the software instructions, the at least one processor is further configured to:

determine a user identifier associated with the user of the sequence of images based at least in part on at least one identifiable feature in at least one image of the sequence of images; and identify the at least one activity log associated with the user based at least in part on the user identifier.

8. The system of clause 1, where, upon execution of the software instructions, the at least one processor is further configured to:

generate a plurality of sub-sequences of images from the sequence of images;

where each sub-sequence of images is associated with a window of time;

utilizing, by the at least one processor for each sub-sequence of images, the at least one behavior determination machine learning model to generate the plurality of movement measurements for each image;

determine, by the at least one processor for each sub-sequence of images, the plurality of movement features based at least in part on the plurality of movement measurements for each image;

utilizing, by the at least one processor for each sub-sequence of images, the at least one fatigue score machine learning model to generate the at least one fatigue score; and updating, by the at least one processor for each sub-sequence of images, the at least one activity log associated with the user based at least in part on the at least one fatigue score for the window of time associated with each sub-sequence of images.

9. The system of clause 8, where, upon execution of the software instructions, the at least one processor is further configured to:

determine a statistical fatigue metric associated with a statistical aggregation of the at least one fatigue score for the window of time associated with each sub-sequence of images;

determine that the at least one fatigue score for a particular window of time associated with a particular sub-sequence of images exceeds a predetermined threshold value;

generate a fatigue risk alert associated with the user based at least in part on the at least one fatigue score being exceeding the predetermined threshold value;

where the fatigue risk alert represents an increased risk of injury to the user due to fatigue; and transmit the fatigue risk alert to at least one computing device so as to provide an alert of the fatigue risk, where the fatigue risk alert is configured to cause the at least one computing device to render at least one graphical user interface element indicative of the fatigue risk alert.

10. The system of clause 9, where, upon execution of the software instructions, the at least one processor is further configured to determine at least one activity adjustment recommendation based at least in part on the statistical fatigue metric, where the at least one activity adjustment recommendation indicates a change to the movement of the user to decrease a risk of injury due to fatigue.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What is claimed is:

1. A method comprising:

receiving, by at least one processor, a sequence of images from a digital imaging device;

wherein the sequence of images capture a sequence of positions in a movement performed by a user;

utilizing, by the at least one processor, at least one behavior determination machine learning model to generate a plurality of movement measurements for each image in the sequence of images based at least in part on:

the sequence of positions in the sequence of images, and at least one behavior determination machine learning layer comprising a plurality of behavior determination machine learning parameters trained to ingest the sequence of images and output the plurality of movement measurements according to training on historical images;

determine, by the at least one processor, a plurality of movement features based at least in part on the plurality of movement measurements for each image in the sequence of images;

utilizing, by the at least one processor, at least one fatigue score machine learning model to generate at least one fatigue score based at least in part on:

the plurality of movement features, and at least one fatigue score layer comprising a plurality of fatigue score parameters trained to ingest the plurality of movement features and output the at least one fatigue score according to training based on training movement measurements;

wherein the at least one fatigue score is indicative of a degree of fatigue exhibited in the sequence of positions of the movement performed by the user; and updating, by the at least one processor, at least one activity log associated with the user based at least in part on at least one fatigue score.

2. The method of claim 1, further comprising:

receiving, by the at least one processor, at least one fatigue self-scoring from at least one computing device associated with the user;

wherein the at least one fatigue self-scoring represents a user input defining a degree of fatigue associated with the movement; and retraining, by the at least one processor, the plurality of fatigue score parameters based at least in part on an error between the at least one fatigue self-score and the at least one fatigue score.

3. The method of claim 1, further comprising:

generating, by the at least one processor, a fatigue risk alert associated with the user based at least in part on the at least one fatigue score being below a predetermined fatigue threshold;

wherein the fatigue risk alert represents an increased risk of injury to the user due to fatigue; and transmitting, by the at least one processor, the fatigue risk alert to at least one computing device so as to provide an alert of the fatigue risk, wherein the fatigue risk alert is configured to cause the at least one computing device to render at least one graphical user interface element indicative of the fatigue risk alert.

4. The method of claim 3, wherein the at least one computing device is associated with at least one manager in a workplace of the user.

5. The method of claim 1, further comprising:

accessing, by the at least one processor, the at least one activity log associated with the user; and determining, by the at least one processor, at least one activity adjustment recommendation based at least in part on the at least one fatigue score, wherein the at least one activity adjustment recommendation indicates a change to the movement of the user to decrease a risk of injury due to fatigue.

6. The method of claim 5, wherein the at least one activity adjustment recommendation comprises at least one decreased activity period indicative of a decrease in at least one movement-related attribute;

wherein the at least one movement-related attribute comprises at least one of:
a movement intensity, and
a movement frequency.

7. The method of claim 1, further comprising:

determining, by the at least one processor, a user identifier associated with the user of the sequence of images based at least in part on at least one identifiable feature in at least one image of the sequence of images; and identifying, by the at least one processor, the at least one activity log associated with the user based at least in part on the user identifier.

8. The method of claim 1, further comprising:

generating, by the at least one processor, a plurality of sub-sequences of images from the sequence of images;

wherein each sub-sequence of images is associated with a window of time;

utilizing, by the at least one processor for each sub-sequence of images, the at least one behavior determination machine learning model to generate the plurality of movement measurements for each image;

determine, by the at least one processor for each sub-sequence of images, the plurality of movement features based at least in part on the plurality of movement measurements for each image;

utilizing, by the at least one processor for each sub-sequence of images, the at least one fatigue score machine learning model to generate the at least one fatigue score; and updating, by the at least one processor for each sub-sequence of images, the at least one activity log associated with the user based at least in part on the at least one fatigue score for the window of time associated with each sub-sequence of images.

9. The method of claim 8, further comprising:

determining, by the at least one processor, a statistical fatigue metric associated with a statistical aggregation of the at least one fatigue score for the window of time associated with each sub-sequence of images;

determining, by the at least one processor, that the at least one fatigue score for a particular window of time associated with a particular sub-sequence of images exceeds a predetermined threshold value;

generating, by the at least one processor, a fatigue risk alert associated with the user based at least in part on the at least one fatigue score being exceeding the predetermined threshold value;

wherein the fatigue risk alert represents an increased risk of injury to the user due to fatigue; and transmitting, by the at least one processor, the fatigue risk alert to at least one computing device so as to provide an alert of the fatigue risk, wherein the fatigue risk alert is configured to cause the at least one computing device to render at least one graphical user interface element indicative of the fatigue risk alert.

10. The method of claim 9, further comprising determining, by the at least one processor, at least one activity adjustment recommendation based at least in part on the statistical fatigue metric, wherein the at least one activity adjustment recommendation indicates a change to the movement of the user to decrease a risk of injury due to fatigue.

11. A system comprising:

at least one edge device comprising at least one processor, wherein the at least one processor is in communication with a non-transitory computer readable medium having software instructions stored thereon, wherein, upon execution of the software instructions, the at least one processor is configured to:

receive a sequence of images from a digital imaging device;

wherein the sequence of images capture a sequence of positions in a movement performed by a user;

utilize at least one behavior determination machine learning model to generate a plurality of movement measurements for each image in the sequence of images based at least in part on:

the sequence of positions in the sequence of images, and at least one behavior determination machine learning layer comprising a plurality of behavior determination machine learning parameters trained to ingest the sequence of images and output the plurality of movement measurements according to training on historical images;

determine, by the at least one processor, a plurality of movement features based at least in part on the plurality of movement measurements for each image in the sequence of images;

utilize at least one fatigue score machine learning model to generate at least one fatigue score based at least in part on:

the plurality of movement features, and
at least one fatigue score layer comprising a plurality of fatigue score regression parameters trained to ingest the plurality of movement features and output the at least one fatigue score according to training on movement measurements;

wherein the at least one fatigue score is indicative of a degree of fatigue exhibited in the sequence of positions of the movement performed by the user; and update at least one activity log associated with the user based at least in part on at least one fatigue score.

12. The system of claim 11, wherein, upon execution of the software instructions, the at least one processor is further configured to:

receive at least one fatigue self-scoring from at least one computing device associated with the user;
wherein the at least one fatigue self-scoring represents a user input defining a degree of fatigue associated with the movement; and retrain the plurality of fatigue score parameters based at least in part on an error between the at least one fatigue self-score and the at least one fatigue score.

13. The system of claim 11, wherein, upon execution of the software instructions, the at least one processor is further configured to:

generate a fatigue risk alert associated with the user based at least in part on the at least one fatigue score being below a predetermined fatigue threshold;
wherein the fatigue risk alert represents an increased risk of injury to the user due to fatigue; and transmit the fatigue risk alert to at least one computing device so as to provide an alert of the fatigue risk, wherein the fatigue risk alert is configured to cause the at least one computing device to render at least one graphical user interface element indicative of the fatigue risk alert.

14. The system of claim 13, wherein the at least one computing device is associated with at least one manager in a workplace of the user.

15. The system of claim 11, wherein, upon execution of the software instructions, the at least one processor is further configured to:

access the at least one activity log associated with the user; and determine at least one activity adjustment recommendation based at least in part on the at least one fatigue score, wherein the at least one activity adjustment recommendation indicates a change to the movement of the user to decrease a risk of injury due to fatigue.

16. The system of claim 15, wherein the at least one activity adjustment recommendation comprises at least one decreased activity period indicative of a decrease in at least one movement-related attribute;
wherein the at least one movement-related attribute comprises at least one of:
a movement intensity, and
a movement frequency.

17. The system of claim 11, wherein, upon execution of the software instructions, the at least one processor is further configured to:

determine a user identifier associated with the user of the sequence of images based at least in part on at least one identifiable feature in at least one image of the sequence of images; and identify the at least one activity log associated with the user based at least in part on the user identifier.

18. The system of claim 11, wherein, upon execution of the software instructions, the at least one processor is further configured to:

generate a plurality of sub-sequences of images from the sequence of images;
wherein each sub-sequence of images is associated with a window of time;

utilizing, by the at least one processor for each sub-sequence of images, the at least one behavior determination machine learning model to generate the plurality of movement measurements for each image;

determine, by the at least one processor for each sub-sequence of images, the plurality of movement features based at least in part on the plurality of movement measurements for each image;

utilizing, by the at least one processor for each sub-sequence of images, the at least one fatigue score machine learning model to generate the at least one fatigue score; and updating, by the at least one processor for each sub-sequence of images, the at least one activity log associated with the user based at least in part on the at least one fatigue score for the window of time associated with each sub-sequence of images.

19. The system of claim 18, wherein, upon execution of the software instructions, the at least one processor is further configured to:

determine a statistical fatigue metric associated with a statistical aggregation of the at least one fatigue score for the window of time associated with each sub-sequence of images;

determine that the at least one fatigue score for a particular window of time associated with a particular sub-sequence of images exceeds a predetermined threshold value;

generate a fatigue risk alert associated with the user based at least in part on the at least one fatigue score being exceeding the predetermined threshold value;
wherein the fatigue risk alert represents an increased risk of injury to the user due to fatigue; and transmit the fatigue risk alert to at least one computing device so as to provide an alert of the fatigue risk, wherein the fatigue risk alert is configured to cause the at least one computing device to render at least one graphical user interface element indicative of the fatigue risk alert.

20. The system of claim 19, wherein, upon execution of the software instructions, the at least one processor is further configured to determine at least one activity adjustment recommendation based at least in part on the statistical fatigue metric, wherein the at least one activity adjustment recommendation indicates a change to the movement of the user to decrease a risk of injury due to fatigue.

* * * * *